May 19, 1959  F. C. URICH  2,886,871
DOUBLE-ENDED CLOTHES PIN
Filed Dec. 4, 1956
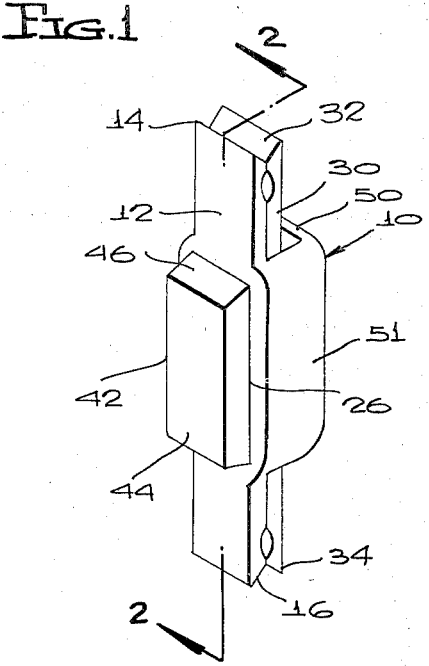
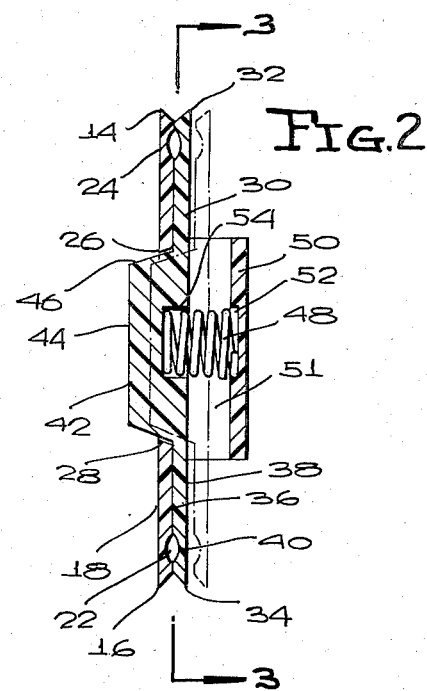
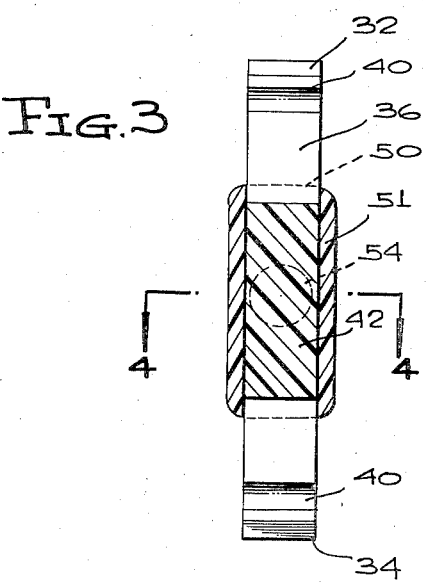
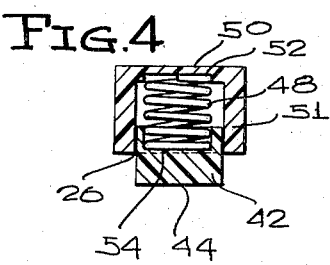
INVENTOR.
FREDERICK C. URICH
BY
McMorrow, Berman & Davidson
ATTORNEYS

2,886,871
DOUBLE-ENDED CLOTHES PIN

Frederick C. Urich, Trinidad, British West Indies

Application December 4, 1956, Serial No. 626,230

1 Claim. (Cl. 24—137)

This invention generally appertains to improvements in the construction of clothes pins and is particularly directed to a novel double-acting clothes pin.

A primary object of the present invention is to provide a clothes pin, which can be selectively opened at both of its ends or at either end by a slight application of manual pressure.

Another important object of this invention is to provide a clothes pin, which comprises a pair of complemental members that are spring urged into face to face engagement and which can be spread apart in parallel positions, so that both ends of the clothes pin are simultaneously opened, or can be spread apart in tilted positions, so that only one end of the clothes pin is open.

Another important object of the present invention is to provide a clothes pin, which can be easily and inexpensively constructed from two complemental members and a spring means, which acts on the members to bias them into clamping relationship.

Another important object of the present invention is to provide novel means for connecting the two members together, so that they are normally retained in facial contact and yet can be easily moved apart by a slight application of manual pressure.

Generally stated, the present invention comprehends the provision of two complemental members, one of which is formed with an opening, intermediate its ends, the other of which is formed with a projection, sized and shaped complementarily to the opening, such projection being extended through the opening and constituting a finger portion, whereby manual pressure can be applied to spread the two members apart. A suitable bearing plate is carried by the apertured member and is spaced from the other member, spring means being interposed between the plate and the other member for retaining both of the members in facial clamping relationship.

The foregoing and ancillary objects are attained by this invention, the preferred embodiment of which is set forth in the following description and illustrated in the accompanying drawing, wherein:

Figure 1 is a perspective view of a clothes pin, constructed in accordance with this invention;

Figure 2 is a longitudinal sectional view taken on line 2—2 of Figure 1 and showing in dotted lines the open position of the clothes pin;

Figure 3 is a longitudinal sectional view taken on line 3—3 of Figure 2, with parts of the pin being shown in elevation; and Figure 4 is a cross sectional view taken on line 4—4 of Figure 3 and illustrating in detail the spring means and mounting arrangement thereof.

Referring now more particularly to the accompanying drawing, the clothes pin 10 includes a first member 12, which has opposing beveled ends 14 and 16. The member 12 is provided with an inner flat face and an outer face and the inner face is formed, adjacent the ends 14 and 16, with transverse grooves 22 and 24.

Intermediate its ends, the member 12 is formed with a rectangular aperture 26, that has inwardly sloped bounding walls or edges 28.

The pin further includes a second member 30, which is coextensive in length and width with the member 12 and is arranged complemental thereto. The member 30 is provided with opposing beveled ends 32 and 34, identical in construction to the ends 14 and 16 of the first member 12. Also, the inner face 36 of the second member is flat and is adapted to be in facial and intimate contact with the inner face 18 of the first member. The second member also includes a rear face 38. The inner face 36 of the second member is provided adjacent the ends 32 and 34 with transverse grooves 40, that are identical in shape and arrangement to the grooves 22 and 24 and which are disposed in confronting relationship therewith.

The second member 30 is formed with a projection or boss 42 that extends outwardly from the inner face 36 thereof and is extended through the aperture 26. The projection is formed with a flat outer face 44 and is provided with beveled side edges 46 that complement the slope of the bounding walls or edges 28 at the aperture 26. The projection 42 extends beyond the outer face 18 of the first member and is arranged at the center of the members.

Means are provided for normally retaining the inner faces of the members 12 and 30 in intimate, clamping relationship. Such means includes a coil spring 48, which is seated between a bearing plate 50 and the outer face of the second member 30, as shown in detail in Figures 2 and 4. The bearing plate 50 extends parallel to and is spaced outwardly from the second member 30 and is arranged so that it extends in width and length the entire extent of the projection, so as to completely overlie the portion of the second member from which the projection 42 extends. The plate 50 is carried by the first member 12 by means of integral side connecting arms 51, so that the plate 50 is an integral part of the member 12. The plate 50 is formed on its inner surface with a socket 52, that is in alignment with a socket 54 formed in the outer face of the member 30 approximately at the center of the projection 42. The ends of the spring 48 are socketed in the sockets 52 and 54, so that the spring is disposed at approximately the center of the projection 42. The spring bears between the bearing plate 50 and the second member 30, so as to urge the inner faces of the members 12 and 30 into facial clamping relationship. The plate 50 and arms 51, together with the first member 12 comprise a housing, which is elongated and substantially rectangular, and which has a pair of oppositely disposed open and closed ends and a continuous peripheral flange projecting laterally from the closed end and comprising a pair of opposing side walls and a pair of opposing end walls, with the end walls having an integrally connected outwardly extending substantially rectangular flange and an enlarged slot extending transversely therethrough, the slots being in registry one with the other and through which the jaw member 30 passes.

In constructing the pin, it is obvious that the members 12 and 30 will be separately formed, the member 12 being formed with the integral bearing plate 50 and the member 30 being formed with the integral projection 42. The member 30 is moved axially into and through the arms 51, until its projection 42 extends through the aperture 26. The members are held in contact, with their inner faces in facial engagement and the spring 48 is compressed and inserted between the plate 50 and the outer face of the member 30, until the ends of the spring find the sockets 52 and 54, whereupon the spring expands and its ends become socketed in the sockets. The spring then functions to bias the members 12 and 30 into clamping relationship.

In using the clothes pin, finger pressure, applied approximately to the center of the outer face 44 of the projection 42 will move the member 30 away from the member 12, the members being moved in parallel relationship, as shown in dotted lines in Figure 2, so that both ends of the pin are simultaneously opened. If the pressure is applied on one end of the projection 42, then it is obvious that one end of the pin will open, while the other will remain closed. Therefore, either both of the ends or a selected one of the ends of the pin may be opened.

It is believed obvious that the pin possesses considerable advantages, since it is not necessary to properly grasp and position the pin for use in attaching clothes to a line, for example, since either end of the pin can be opened and used. In some instances, both ends will be opened and simultaneously used, as where articles of apparel are hung in side by side relationship on a line and pinned or held together at their lower ends.

It is believed that the pin can be inexpensively, easily and quickly manufactured and assembled and can be made of any type of suitable material, such as plastic, wood or the like.

While the preferred form of this invention has been shown and described herein, other forms may be realized, as come within the scope of the appended claim.

What is claimed is:

A clothes pin comprising a pair of elongated substantially rectangular jaws normally disposed in juxtaposed confronting relation relative to each other and movable away from and towards each other to assume their releasing and clamping positions, respectively; one of said jaws comprising an elongated substantially hollow rectangular housing having a pair of oppositely disposed open and closed ends and a continuous peripheral flange projecting laterally from said closed end and comprising a pair of opposed side walls and a pair of opposed end walls, each of said end walls having an integrally connected outwardly extending substantially rectangular flange and an enlarged slot extending transversely therethrough, said slots being in registry one with the other; the other of said jaws comprising an elongated substantially rectangular member having an integrally formed elongated centrally located substantially rectangular boss projecting laterally from one side thereof; said member being normally disposed within said housing with said boss normally projecting laterally through said open side of said housing, said boss having a pair of oppositely disposed ends converging in a direction away from said one side of the rectangular member and said open end of the housing having a pair of oppositely disposed bounding end walls juxtaposed relative to said ends of the boss and inclined complementary to the angle of inclination of the ends of the boss, and the adjacent portions of said rectangular member extending through said slots and disposed in side-by-side engagement with said flanges, the adjacent surfaces of said rectangular member and said closed end of said housing being disposed in spaced relation relative to each other; said rectangular member and said closed end of said housing each having coaxially aligned recesses formed therein; and an elongated resilient element having a pair of opposed ends, said opposed ends of said element being positioned within said recesses and constantly biasing said member for movement towards said flanges and into said clamping position.

References Cited in the file of this patent

UNITED STATES PATENTS

| 209,409 | Lucas | Oct. 29, 1878 |
| 1,616,881 | Wharton | Feb. 8, 1927 |
| 1,639,278 | Wharton et al. | Aug. 16, 1927 |
| 2,615,221 | Linton et al. | Oct. 28, 1952 |